United States Patent
Immendorf et al.

(10) Patent No.: US 10,045,149 B2
(45) Date of Patent: Aug. 7, 2018

(54) METHOD AND SYSTEM FOR USER EQUIPMENT IDENTIFICATION IN A NETWORK

(71) Applicant: GeoVisible, Inc., Seattle, WA (US)

(72) Inventors: Charles Immendorf, Seattle, WA (US); Eamonn Gormley, Seattle, WA (US); Neil Stobie, Seattle, WA (US); Charles James Judson, Seattle, WA (US)

(73) Assignee: GEOVISIBLE, INC., Seattle, WA (US)

(*) Notice: Subject to any disclaimer, the term of this patent is extended or adjusted under 35 U.S.C. 154(b) by 0 days.

(21) Appl. No.: 15/889,081

(22) Filed: Feb. 5, 2018

(65) Prior Publication Data

US 2018/0160267 A1   Jun. 7, 2018

Related U.S. Application Data (63) Continuation-in-part of application No. 15/201,168, filed on Jul. 1, 2016, now Pat. No. 9,918,212.

(60) Provisional application No. 62/190,450, filed on Jul. 9, 2015, provisional application No. 62/190,445, filed on Jul. 9, 2015.

(51) Int. Cl.
*H04M 11/04* (2006.01)
*H04W 4/021* (2018.01)
*H04W 8/00* (2009.01)
*H04W 4/90* (2018.01)

(52) U.S. Cl.
CPC ............. *H04W 4/021* (2013.01); *H04W 4/90* (2018.02); *H04W 8/005* (2013.01)

(58) Field of Classification Search
None
See application file for complete search history.

(56) References Cited

U.S. PATENT DOCUMENTS

2015/0111524 A1* 4/2015 South ...................... H04W 4/90
455/404.2

\* cited by examiner

*Primary Examiner* — Suhail Khan (57) ABSTRACT

A method that identifies user equipment (UE) in both idle mode and connected mode in a cellular network is performed when an indication of an emergency situation is received. The method can identify all UEs within a geofenced area. The geofenced area can be an arbitrary shape that is automatically or manually created. The emergency system receives unique identities of UEs in the geofenced area that are provided when the location area identifier value is changed.

20 Claims, 4 Drawing Sheets

METHOD AND SYSTEM FOR USER EQUIPMENT IDENTIFICATION IN A NETWORK

CROSS-REFERENCES TO RELATED APPLICATIONS

The present disclosure is a continuation-in-part of U.S. Non-Provisional application Ser. No. 15/201,168, filed Jul. 1, 2016 which claims priority to U.S. Provisional Application No. 62/190,450, filed Jul. 9, 2015 and to U.S. Provisional Application No. 62/190,445, filed Jul. 9, 2015, each of which are incorporated by reference herein for all purposes.

BACKGROUND

Cellular networks are typically capable of determining the locations of User Equipment (UE). Location information for a UE can be used for many purposes, such as delivering location-specific information to users. One field that benefits from accurate location information for UEs is emergency services.

There are many challenges associated with determining locations for UE. Multiple operators provide cellular service to the same geographic areas, so mechanisms that are limited to a single network can only discover a fraction of UEs that are present in a given area. In addition, a portion of the UEs are in idle mode at any given time, which limits the extent to which the UEs can communicate.

TECHNICAL FIELD

Embodiments of the present disclosure relate to systems and methods for the identification of communication devices within a defined geographic area.

BRIEF SUMMARY

Embodiments of this disclosure provide a method and system for identifying user equipment in a cellular telecommunications network.

In an embodiment, a method for identifying UEs includes receiving an indication of an emergency situation, establishing a first geofenced area associated with the emergency situation, identifying one or more cells in the first geofenced area, transmitting a request to change a location area identifier value to one or more network providing service to the one or more cells, and receiving identities of UEs in the first geofenced area. In such an embodiment, the identities of UEs in the first geofenced area are provided when the location area identifier value is changed. The identities of UEs are collected even when the UEs are in idle mode.

In an embodiment, a second geofenced area is established, and all UEs within the second geofenced area are identified. The second geofenced area may be an arbitrary shape. In an embodiment, the second geofenced area is a circle that is defined by radius around a point. The point may be, for example, the location of a first UE, and the first UE may be a UE from which the indication of the emergency situation was received.

In an embodiment, a method for identifying user equipment (UE) includes receiving an indication of an emergency situation, establishing a geofenced area around a location of the emergency situation, identifying one or more cells in the geofenced area, transmitting a request to change a location area identifier value to one or more network providing service to the one or more cells, and receiving identities of UEs in the geofenced area, wherein the identities of UEs in the geofenced area are provided when the location area identifier value is changed. The identities of UEs may include identities of UEs in idle mode and identities of UEs in connected mode.

In an embodiment, the indication of the emergency situation is received from an emergency call center. Requests to change the location area identifier value may be transmitted to a plurality of cellular networks each operated by different operators.

In an embodiment, in response to the request to change the location area identifier value, a network providing service to the one or more cells replaces a first location area identifier value with a second location area identifier value. After replacing the first location area identifier value with the second location area identifier value, the one or more network may restore the original location area identifier value by replacing the second location area identifier value with the first location area identifier value. The first and second location area values may be a Location Area Code (LAC) or a Tracking Area Code (TAC).

In an embodiment, establishing the geofenced region includes determining a plurality of neighbor cells that are on a Neighbor Relations Table (NRT) of the target cell, and setting the geofenced region to include coverage areas of the plurality of neighbor cells on the NRT. Establishing the geofenced region may include determining a plurality of neighbor cells that are first tier neighbors of a target cell, and setting the geofenced region to include coverage areas of the first tier neighbor cells. Identifying the one or more cells may include determining all macrocells that are located within the geofenced area for each operator network of a plurality of operator networks providing service to the geofenced area.

DETAILED DESCRIPTION

A detailed description of embodiments is provided below along with accompanying figures. The scope of this disclosure is limited only by the claims and encompasses numerous alternatives, modifications and equivalents. Although steps of various processes are presented in a particular order, embodiments are not necessarily limited to being performed in the listed order. In some embodiments, certain operations may be performed simultaneously, in an order other than the described order, or not performed at all.

Numerous specific details are set forth in the following description in order to provide a thorough understanding. These details are provided for the purpose of example and embodiments may be practiced according to the claims without some or all of these specific details. For the purpose of clarity, technical material that is known in the technical fields related to this disclosure has not been described in detail so that the disclosure is not unnecessarily obscured.

Figure 1:
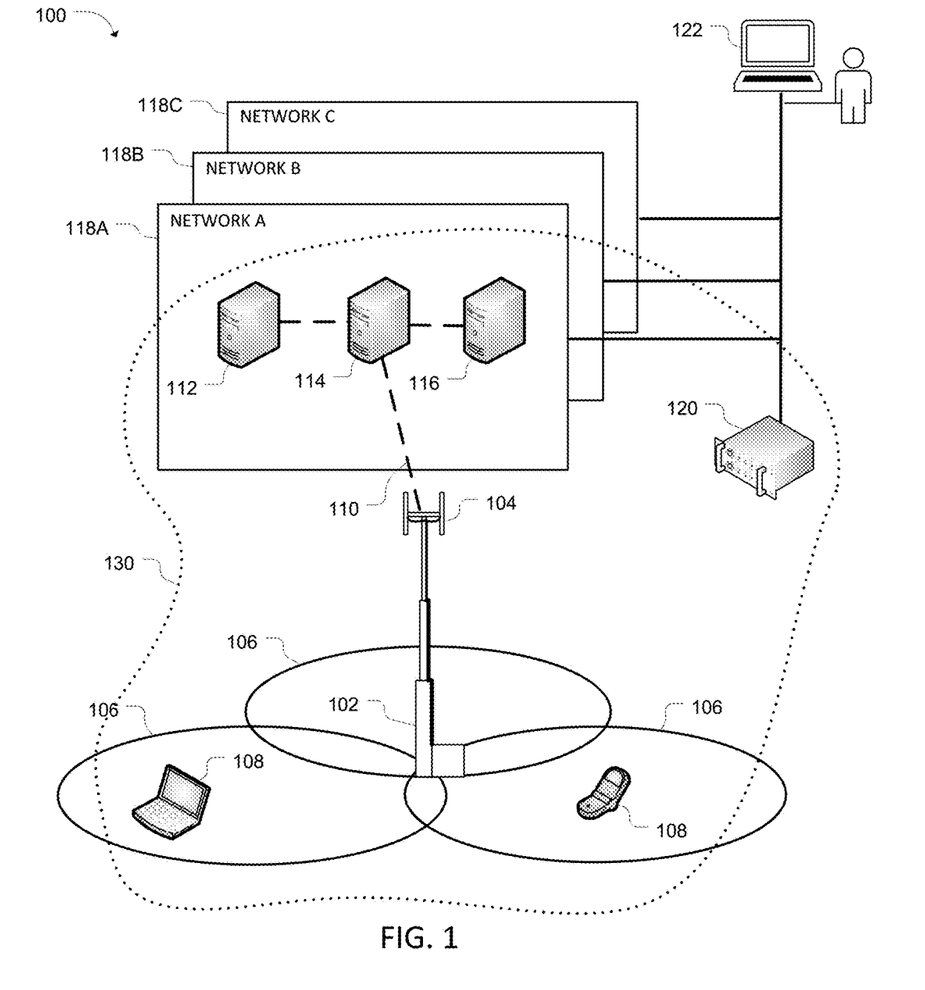
FIG. 1 illustrates a wireless communications system according to an embodiment.

FIG. 1 illustrates a networked wireless communications system 100 according to an embodiment. System 100 may include one or more base stations 102, each of which are equipped with one or more antennas 104. Each of the antennas 104 may provide wireless communication for user equipment 108 in one or more cells 106. As used herein, the term "base station" refers to a wireless communications station that serves as a hub of a wireless network. For example, in a Long Term Evolution (LTE) cellular network, a base station may be an eNodeB.

The base stations 102 may provide service for macrocells, microcells, picocells, or femtocells 106. FIG. 1 shows an embodiment in which base station 102 provides wireless communication services to three cells 106. The cells may be specific to a particular Radio Access Technology (RAT) such as GSM, UMTS, LTE, etc.

Due to the directionality of some RF antennas 104, each base station 102 may serve a plurality of cells arrayed about the base station site. In a typical deployment, a base station 102 provides functionality of three to six cells 106, which are deployed in a sectorized fashion at a site. In other embodiments, one or more base station 102 may be outfitted with an omnidirectional antenna that provides service to a single cell for a given RAT. Multiple base stations 102 may be present at a site and each base station may support one or more cellular communications technologies (e.g., a base station may support UMTS and LTE cells). The one or more UE 108 may include cell phone devices, laptop computers, handheld gaming units, electronic book devices and tablet PCs, and any other type of common portable wireless computing device that may be provided with wireless communications service by a base station 102.

The system 100 may include a backhaul portion 110 that can facilitate distributed network communications between backhaul equipment 112, 114 and 116 and one or more base station 102 within a first operator network 118A. In an embodiment, the backhaul portion of the network includes intermediate links between a backbone of the network which is generally wire line, and sub networks or base stations 102 located at the periphery of the network. The network connection between any of the base stations 102 and the rest of the world may initiate with a link to the backhaul portion of a provider's communications network. The backhaul 110 may include an X2 connection through which base stations 102 communicate with one another directly.

The devices 112, 114 and 116 may be any of a plurality of network equipment such as a Radio Resource Manager (RRM), a Mobility Management Entity (MME), a serving gateway (S-GW), a Radio Network Controller (RNC), a base station controller (BSC), a mobile switching center (MSC), a Self-Organizing Network (SON) server, an Evolved Serving Mobile Location Server (eSMLC), a Home Subscriber Server (HSS) etc. Persons of skill in the art will recognize that network devices 112, 114 and 116 are different depending on the particular RAT or set of RATs that are provided in first operator network 118A.

FIG. 1 shows three different networks 118A, 118B and 118C that are controlled by different operators. In an embodiment, the different operators are independent licensors of RF spectrum, where the different operators control different portions of spectrum. For example, RF spectrum in the U.S.A. is auctioned by the FCC to various cellular providers, which operate separate and independent networks 118A, 118B and 118C. In other embodiments, a network may be controlled by some other entity such as a business or government agency.

In the embodiment of FIG. 1, the three independent networks 118A, 118B and 118C are coupled to an emergency mediation server 120. An emergency mediation server 120 may include one or more computer devices that provide services to a plurality of UEs 108. In an embodiment, UEs 108 may have program instructions stored thereon which, when executed by a processor, communicate with a remote computing device to provide emergency services to a user. The emergency mediation server 120 may include a database that stores preferences and settings for a plurality of users, including emergency contact groups, current locations of users, protocols for handling particular emergency situations, etc.

In addition, the networks 118 are coupled to an emergency dispatch center 122. An emergency dispatch center may include computer devices and personnel that receive and process requests for emergency services from users. For example, in the U.S.A., dispatch center 122 may be a 911 call center. The dispatch center 122 may receive voice and data from UE 108 directly from the networks 118. In addition, the dispatch center 122 may receive information from the emergency mediation server 120.

Figure 2:
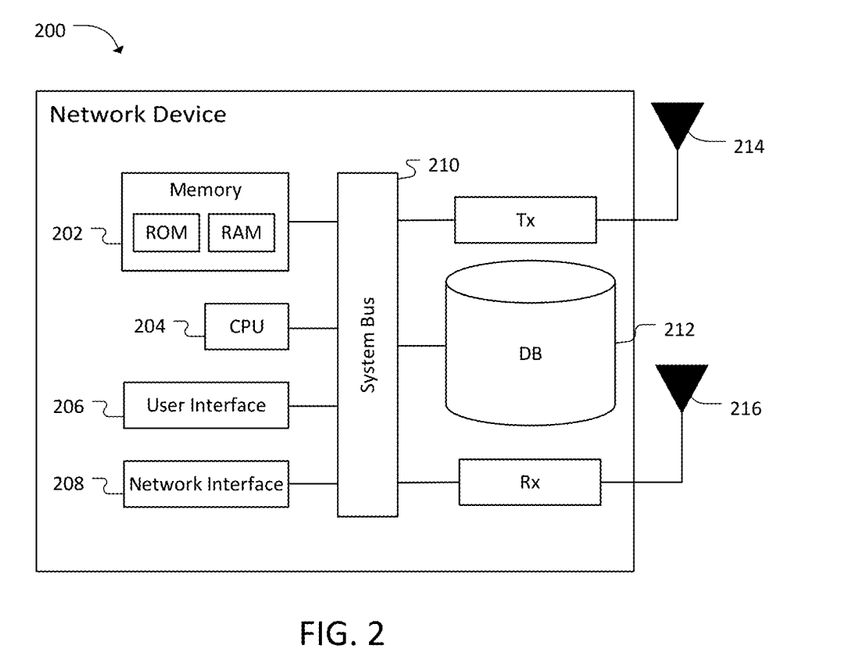
FIG. 2 illustrates a network device according to an embodiment.

FIG. 2 illustrates a block diagram of a network device 200 that may be represent UE 108, network controller devices 110, 112 and 114, an emergency mediation server 120, etc. The network device 200 has one or more processor devices including a CPU 204. The CPU 204 is responsible for executing computer programs stored on volatile (RAM) and nonvolatile (ROM) memories 202 and a storage device 212 (e.g., HDD or SSD). In some embodiments, storage device 212 may store program instructions as logic hardware such as an ASIC or FPGA. The storage device 212 and ROM of memory 202 are non-volatile computer readable media that may have computer executable instructions stored thereon which, when executed by the CPU 204, cause the network device to perform one or more operations according to embodiments of the present disclosure.

The network device 200 may also include a user interface 206 that allows a user to interact with the network device's software and hardware resources and to display the performance and operation of the system 100. In addition, the network device 200 may include a network interface 206 for communicating with external devices, and a system bus 210 that facilitates data communications between the hardware resources of the network device. If the Network device has wireless connectivity, it may have a transmitter 214 and a receiver 216, each of which may include one or more antennas that operate on one or more frequencies.

Embodiments of the present disclosure may be performed by an emergency system 130 that performs a plurality of emergency-related processes. An emergency system 130 may include one or more of the network components shown in FIG. 1, such as the emergency mediation server 120, network devices 112, 114 and 116, user equipment 108, and base station 102. In some embodiments, an emergency system 130 is based on an emergency mediation server 120 with computer-readable instructions stored thereon which, when executed by one or more processor of the mediation server, provide emergency services.

An emergency system may receive, process and route emergency requests between subscribers and the emergency dispatch center 122. In an embodiment, the emergency system 130 may transmit a request for an accurate location (e.g. latitude, longitude) to a geo-location system when not provided as part of the normal emergency call procedure (e.g. for emergency requests initiated through a mechanism other than a 911 call). The geo-location processes may be implemented by the emergency mediation server 120 or may be provided as a service through interfaces to a geolocation system, such as an eSMLC.

The emergency system 130 may maintain a subscriber register which includes subscriber profiles and details on subscribers' authorized emergency proxy groups and emergency notification groups with various levels of security. The subscriber register may be implemented as a database of emergency mediation server 120. The subscribers may be users that are subscribed to emergency services provided by the emergency system 130.

An emergency system may be implemented within existing switching systems in the cellular network, and/or as a separate hardware entity with interfaces to a cellular network. A single emergency system may interface to a single cellular network 118 or to multiple cellular networks such as networks 118A, 118B and 118C maintained by different operators.

The emergency system 130 is also capable of storing emergency requests which originate from the emergency dispatch center 122 and performing automated monitoring of the targeted subscriber to enable onward transmission of the requests immediately as conditions allow, for example when a location area update is seen for the subscriber.

The emergency system 130 may also interact with subscriber devices, e.g. UE 108, to ensure that information is only provided to the emergency dispatch center 122 if the subscriber permits this information to be shared. For example, in an embodiment, a subscriber's information is only forwarded to the emergency dispatch center 122 if the subscriber actually places a call to the emergency dispatch center 122. The subscriber's UE 108 may provide confirmation of such a call being placed in a cryptographically secure fashion. This can help prevent malicious or unauthorized retrieval of subscriber information by the emergency dispatch center 122.

In addition, the emergency system 130 may determine a set of cells that define a specific geographic (geo-fenced) area for one or more operational cellular networks 118 in the vicinity of an emergency event. The emergency system 130 may identify, track, and/or confirm the presence of all subscribers within the geo-fenced area and coordinate messaging, status updates and other activities for those subscribers.

In an embodiment, the emergency dispatch center 122 receives incoming emergency requests from subscribers as well as incoming emergency requests in the form of phone calls from family or other members of an emergency proxy group who may be concerned about a subscriber. Elements of the emergency system 130 may be located at an emergency dispatch center 122, such as a hardware device that performs one or more processes in conjunction with other elements of the emergency system to provide subscribers with emergency services.

When an emergency request is received at an emergency dispatch center 122, a determination may be made on the optimal course of action. The emergency dispatch center 122 may then request the emergency system 130 to perform the action. For example, the emergency dispatch center 122 can request the emergency system 130 to transmit communications to all members of an emergency notification group, or to user equipment within a geo-fenced area.

In an embodiment, UEs in a network have a set of program instructions stored thereon that extend functionality of the UE and interface with one or more external hardware devices to provide emergency services to the user. The emergency services may include, for example, the ability for the user to configure one or more emergency notification groups, configure one or more emergency proxy groups, and accept or reject invitations to join other users emergency notification groups or emergency proxy groups. For example, a subscriber may have one emergency notification group for medical emergencies, one for emergencies related to a car breaking down, etc.

Subscribers may be members of multiple emergency notification groups or emergency proxy groups created by other subscribers. When a subscriber adds a member to a group, the emergency application sends a message to the member, inviting him/her to join the group. The member may accept or reject the invitation. Group information may be stored in a database of an emergency mediation server 120.

In an embodiment, the UE 108 may be in communication with the emergency mediation server 120, and the emergency mediation server may communicate with the UE as well as an emergency dispatch center 122. Accordingly, the emergency mediation server 120 may facilitate communication between the UE 108 and the emergency dispatch center 122, instead of or in addition to communications directly from the UE 108 to the emergency dispatch center 122.

In an embodiment, when a subscriber makes a call to an emergency number such as 911, an emergency request may be automatically transmitted to the emergency mediation server 120, or a request may be transmitted directly to the emergency mediation server 120 from UE 108. On submission of a subscriber initiated emergency request or on reception of dispatch initiated emergency request, UE 108 may perform several processes, including silent initiation of a call in which a data connection is setup through the cellular network, and silent initiation of audio and/or video recording and retrieval of location data, e.g. GPS and Wi-Fi data from the UE.

The data connection between the UE and the emergency mediation server 120 may be used to transfer information about the subscriber including their location data, UE status (e.g. battery level), emergency request type and video/audio data stream to/from the emergency dispatch center 122. In addition, the emergency system 130 may be capable of storing a subscriber initiated emergency request when the UE is out of cellular coverage range and, and performing automated monitoring of the cellular network conditions for onward transmission of the emergency request immediately as conditions allow. In addition, the emergency system 130 may enable forced continuation of the data connection even if the normal emergency call has been terminated and the UE 108 is turned "off."

In an embodiment, a data connection is established between the emergency dispatch center 122 and the emergency mediation server 120 that provides UE data to the emergency dispatch center. For example, the UE 108 may provide one or more of location data, cell phone status data (e.g. battery level), emergency request data related to a category of emergency request, audio data and video data to the emergency mediation server 120. Such data may be processed by the emergency mediation server 120, and selectively transmitted to the emergency dispatch center 122.

Communications between the UE 108, the emergency mediation server 120 and the emergency mediation server 120 may be protected by one or more security mechanism. For example, elements of the UE that relate to emergency services may be protected by a password, in addition to or instead of biometric protection. Data related to the emergency services that is stored on the UE may be encrypted, and all emergency communications between the UE 108 and the emergency mediation server 120 and between the emergency mediation server and the emergency dispatch center 122 may be encrypted as well.

In some embodiments, the UE 108 is authenticated to the emergency mediation server 120, so that the emergency mediation server only accepts communications from authenticated hardware, thereby prohibiting unauthorized devices from communicating on behalf of a particular subscriber. The emergency mediation server 120 may authenticate all communications to and from the emergency dispatch center 122. In addition, membership in various emergency notification groups and emergency proxy groups may require verification from members before they are added to the groups.

Figure 3:
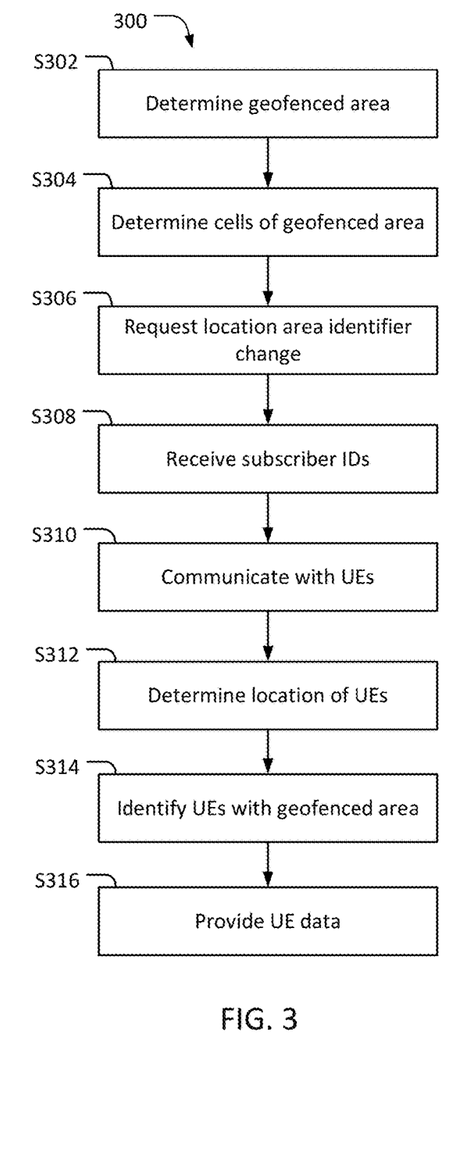
FIG. 3 illustrates a process for identifying user equipment in a network.

FIG. 3 shows a process 300 for identifying cellular devices in a region of a cellular network. The process may be initiated by a government agency or emergency service provider. For example, when an emergency such as an earthquake, terrorist attack, or hostage situation occurs in an area, law enforcement agencies and emergency service providers may wish to catalog and/or communicates with users in the vicinity of the emergency situation. Therefore, such agencies may initiate process 300 by, for example, transmitting a request to an emergency management system 130. In another embodiment, process 300 is initiated by a user providing an input into a UE indicating the presence of an emergency situation, and a location for the emergency situation.

A geofenced area is determined at S302. In one embodiment, the geofenced area is determined by an external agency such as an emergency dispatcher or law enforcement agent that has situational awareness, and provides the geofenced area to an emergency management system 130. An emergency management system may determine a geofenced area at S302 using information received from an emergency call center or other external agency. For example, an emergency call center may indicate a radius value which the emergency management system applies to location information for a UE to determine a geofenced area. In other embodiments, the emergency management system 130 determines the geofenced area without input from the external agency.

In an embodiment, the geofenced region is centered around a target cell that provides service to a particular UE, and the geofenced region moves as the UE is handed over to new cells. In an embodiment, a geofenced region may be established around a UE that initiates a 911 call, and that geofenced region may move as the UE moves.

In other embodiments, the geofence may be manually or automatically selected based on various factors. For example, a geofence may be designated by an operator or emergency service personnel around a region of interest. The geofence may be an area that is defined by a circle around a particular geographic location. In such an embodiment, the location of the center point and the radius of the circle may be designated manually by the operator or emergency service personnel, or automatically.

Geofences of other shapes are possible. A geofence may be a polygon that is bounded by lines between designated points, a rectangle, a triangle, a regular polygon such as a square, or any combination of geometric shapes. The boundaries of the geofence may be based on political boundaries such as a city, town or county, geographic features such as an island or river, etc.

Figure 4:
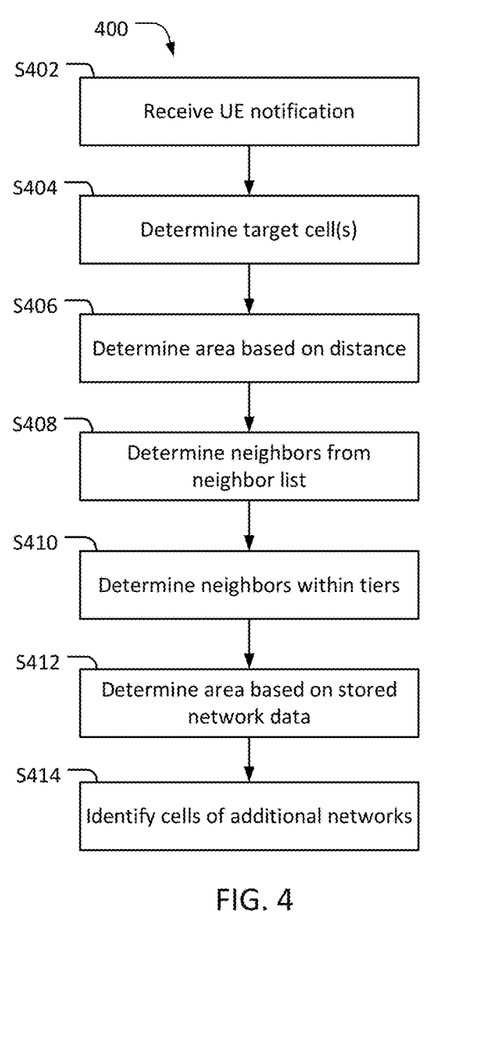
FIG. 4 illustrates a process for automatically determining neighbor cells in a network.

FIG. 4 shows an embodiment of a process 400 for automatically determining a geofenced area. Process 400 may initiate when a notification is received from a UE. The notification may be, for example, a call to an emergency service provider, such as a 911 call. In an embodiment, the UE may be programmed to transmit location information, or information that can be used to determine a location of the UE, when it is used to indicate an emergency. Thus, the notification from the UE may include one or more of the following non-exhaustive list of information: an identifier for the UE such as a Cellular Global Identifier (CGI), an identity of a cell that is providing service to the UE, GPS coordinates for the UE, network location data for the UE such as eSMLC data, and the operator of the network providing service to the UE.

A target cell is determined at S404. The target cell may be the cell providing service to a UE that initiated the process 300 by, for example, dialing 911 or otherwise requesting emergency services. In another embodiment, the target cell is determined geometrically to be the closest cell to a location of an emergency. The emergency management system 130 may determine a target cell for the UE using information received at S402.

When the UE has provided location information such as geographical coordinates, an address or a postal code, this information may be used to identify cells that provide service to that particular area. When the UE notification indicates the cellular operator that controls the network providing service to the UE, then the location information may be compared to service areas of cells that are controlled by the operator to identify a target cell.

In an embodiment, when the identity of the cell providing service to the UE is not received at S402, only macro cells are candidates for being determined as the target cell. Such an embodiment may simplify determining a target cell when a large amount of small cells are present in an area associated with the UE.

A target cell may be determined at S404 for every operator network that provides service to the area of the emergency. When a target cell is determined to be the cell providing service to a UE in a first operator network, target cells for other operator networks may be the cells that are geometrically closest to the cell providing service to the UE.

In some embodiments, more than one target cell may be determined at S404. For example, when the location data for a UE is a zip code, several macro cells of a cellular network may provide service to the zip code. In this case, each of the cells may be selected as a target cell. In an embodiment, determining target cells at S404 is accomplished by comparing location data of the UE to a lookup table or database that correlates cells with locations. One or more target cell may be identified for every operator that provides cellular services to the region of the UE.

An emergency management system 130 may maintain one or more database that may be consulted when determining one or more target cell at S404. For example, the emergency management system may maintain a database of geo-located subscriber call records. In another embodiment, the system 130 maintains a database of predicted cell coverage areas that is created, for example, through a cellular network planning or RF prediction tool.

The one or more target cell may be used to determine a geofenced area around the one or more target cell. In some embodiments, the geofenced area may be limited to the one or more target cell, where the geofenced area corresponds to coverage areas of the one or more target cell. In other embodiments, the geofenced area may be determined by examining neighbors of the one or more target cell.

The extent of the geofenced area, including whether neighbors of target cells are considered in the geofenced area, may depend on a number of factors. One factor is the nature of the situation that initiated the process 300. If the situation is a widespread emergency such as a tsunami or an earthquake that affects a relatively large area, then the geofenced area may extend beyond the service area of a target cell.

Another factor that may be considered when determining the extent of the geofenced area is the density of cells around the target cell. When the target cell is in a rural area in which each cell has a relatively large coverage area, then the motivation to consider neighbor cells is diminished. However, in a high density region such as a metropolitan area, cell coverage areas are smaller and tend to have higher degrees of overlap, so areas with high cell density are more likely to include coverage areas of cells that neighbor cells.

Figure 5:
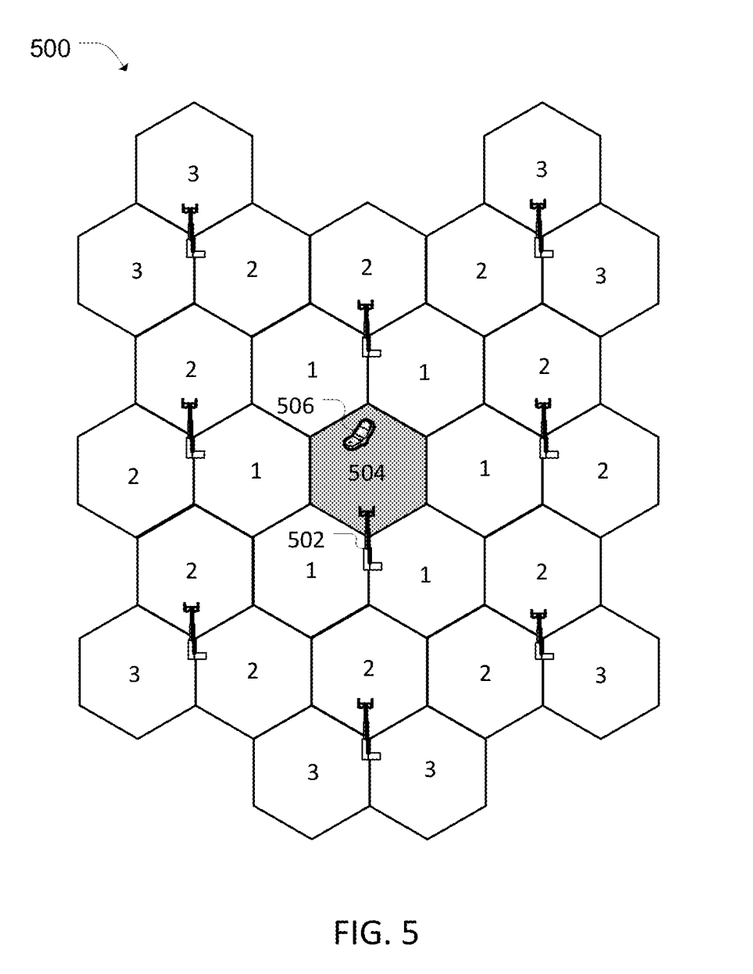
FIG. 5 illustrates an embodiment of neighboring cells in a cellular network.

Embodiments of determining geofenced areas using neighbor cell information will now be explained with respect to FIG. 5. FIG. 5 illustrates a cellular telecommunications network 500 that includes a plurality of base stations 502, each of which provides service to three cells, which are represented as hexagons. In network 500, UE 506, which may be the UE from which the notification was received at S402, is located within the coverage area of cell 504. Therefore, cell 504 is determined as the target cell at S404. In addition, FIG. 5 illustrates a plurality of base stations that provide service to cells that are intra-frequency neighbors of target cell 504.

In an embodiment, a set of neighboring cells may be identified by a geometric mechanism such as a predetermined distance from the cell 504 or a geographic location of UE 506 at S406. For example, the location of the target cell 504 may be represented by latitude and longitude coordinates of a point, such as the centroid of a cell coverage area or a location of the base station. In such an embodiment, all cells that are located within a predetermined distance of the location for target cell 504 are included in the set of neighboring base stations.

In another embodiment, a set of neighbors may be determined at S408 based on information that is used by the wireless network for mobility purposes. For example, the set of neighbors determined at S408 may be each of the neighboring cells that are present on a mobility neighbor list for the target cell 504. In particular, the set of neighbors may be the same as handover targets on the Neighbor Relations Table (NRT) of the target cell 504. This disclosure refers to these neighbors as first hop neighbors.

The set of neighbors may include neighbors of neighbors of the target cell 504 for the UE 506. The neighbors of neighbors are the handover targets on the NRTs of the first hop neighbors, which may be referred to as second hop neighbors. Similarly, the set of neighbors may include the set of cells appearing on the neighbor lists of the cells appearing on the neighbor lists of the cells on the neighbor list of the serving cell (third hop neighbors), etc. Neighbors with higher hop values may be used, for example, in a heterogeneous network (HetNet) in which small cells such as femtocells are present.

In another embodiment, the set of neighbors may be determined using the cells that are present in a Detected Set Report (DSR) for the UE.

In yet another embodiment, the set of neighboring cells includes cells that are within a configurable number of neighbor tiers of the source cell. In such an embodiment, first tier neighbor cells are cells that have a coverage area that is adjacent to or overlapping with a coverage area of a source cell. Similarly, a second tier neighbor cell is a cell that has a coverage area that is adjacent to or overlapping with a coverage area of a first tier neighbor of a source cell, and that is not a first tier neighbor of the source cell.

Neighbor tier relationships between cells may be recorded in a telecommunications system. Therefore, in an embodiment, determining a set of neighbors at S410 includes receiving neighbor tier relationship information from a cellular telecommunications system and determining the cells that are within a configurable number of tiers from the source cell. For example, when the number of tiers is configured to be three, then the set of neighbor cells includes the first tier, second tier, and third tier neighbors of the target cell 504.

FIG. 5 shows an embodiment of a target cell 504 and some of its first, second and third tier neighbors. The cells designated with a "1" have coverage areas that are adjacent to target cell 504, so they are first tier neighbors. Similarly, cells that are adjacent to the first tier neighbors are second tier neighbors marked with a "2," and cells that are adjacent to the second tier neighbors and are not first tier neighbors are third tier neighbors marked with a "3."

In an embodiment, the neighbor cells identified at one or more of S406, S408 and S410 define the geofenced area. In one example, a geofenced area is defined by first and second tier neighbors of a serving cell. In such an embodiment, the first and second tier neighbors are determined at S410, and the geofenced area of FIG. 5 is the area occupied by the cells marked "1" and "2." Similarly, the geofenced area may correspond to the area occupied by first and second hop neighbor cells determined at S408.

The geofenced area may be determined based on geographic area information stored by, for example, a database of an emergency mediation server. Examples of the geographic area information include political boundaries such as the boundaries defining cities, counties, states and nations, network boundaries such as sub-networks, tracking areas and location areas, zones such as urban and rural zones, neighborhoods, user-defined areas, etc.

Several different operator networks, or wireless service providers, typically provide cellular services to the same geographic areas. Some embodiments may identify users of all operator networks within a geofenced area. Therefore, process 400 of automatically determining a geofenced area may be performed for a plurality of cellular networks run by different operators that are active in the geographic area around the UE 506 at S414.

There are several ways in which cells of networks maintained by other operators may be determined at S414. In one embodiment, a geofenced area of the operator network 500 which provides service to UE 506 is applied to plural operator networks, and all cells within the geofenced area are identified. In another embodiment, elements of process 400 are repeated for each operator network. For example, a target cell corresponding to the target cell of the first operator network may be identified for each additional operator network at S404, and a geofenced area is determined for the additional operator networks using processes according to S408 and S410.

Returning to FIG. 3, cells of a geofenced area are determined at S304. In an embodiment in which a geofenced area is transmitted from an emergency service provider or government agency at S302, determining the cells at S304 may include identifying cells that have a coverage area that overlaps with or are enclosed by the geofenced area. In other embodiments, such as an embodiment in which the geofenced area is automatically determined based on neighbor cells by process 400, the cells of the geofenced area may be the target cell and the neighbor cells identified by that process.

Cellular networks are subdivided according to location area identifiers, which are Location Areas (LAs) that are identified by Location Area Codes (LACs) in 3G networks, and Tracking Areas (TAs) that are identified by Tracking Area Codes (TACs) in 4G networks. Each location area includes a distinct group of base stations that provide service to a plurality of cells.

A request to change at least one location area identifier is made at S306. When location area identifiers are changed, the network forces all UEs in the affected areas to register with the network. In an embodiment, the request at S306 is transmitted by an emergency mediation server 120 to one or more MMEs associated with the geofenced area.

The request to change location area identifiers (e.g., TAC and LAC) may be targeted to the geofenced area. Therefore, in an embodiment, the values of location area identifiers are selectively changed for cells in the geofenced area. The location area identifier values may be changed by automated parameter update processes that alter the current local area identifier in each cell of interest. For example, the emergency mediation server 120 may transmit a message to an MME that instructs the MME to change TACs for cells in the geofenced area, thereby soliciting Tracking Area Update Request messages that include unique identifiers from attached UEs in idle mode and connected mode.

In an embodiment, the location area identifiers are changed to a temporary location area identifier value, and then changed back to the original location area identifier values. The temporary identifier may be a specific identifier that is not otherwise present in a network.

When different location area identifiers are registered, the network makes globally unique identities such as International Mobile Subscriber Identities (IMSIs) of devices (UEs) that are being served by the affected cells available to the network. Networks will make these identities available even for UEs that are in an idle mode. Therefore, the list of device IDs that is returned by the network at S308 is a more thorough list of devices that are present in the area than techniques that only discover users that are in connected mode.

The subscriber IDs returned at S308 may be temporary subscriber identities which may be linked within a cellular network to a globally unique subscriber identity for the UE. In particular, the subscriber IDs returned at S308 may be temporary subscriber identities which may be linked within a cellular network to a globally unique subscriber identity for the UE (e.g. IMSI, ESN, dynamically assigned device IP Address, etc.) The subscriber IDs may be received by an emergency mediation server 120 from each network for which a location area identifier change was requested at S306.

After the list of subscriber IDs is received, the emergency management system 130 may perform one or more subsequent processes in relation to UEs associated with the IDs on the list. In some embodiments, the list is cross-referenced with a list of devices that are present in a database of the emergency management server 120, and the one or more subsequent processes are only performed for such devices. However, in other embodiments, the one or more subsequent processes are performed for all UEs whose IDs were received at S308, or for some other portion of those UEs.

In an embodiment, the system communicates with the UEs in the geofenced area at S310. For example, when an emergency situation such as a natural disaster affects the geofenced area, the emergency management system 130 may transmit messages to UEs in the geofenced area informing users of the emergency situation. Communicating with the UEs may include requesting status information from users, such as whether the users are in need of assistance or are safe.

In another embodiment, locations of the UEs may be determined at S312. Locations may be determined by existing location based systems such as an SMLC and eSMLC, or within the emergency management system 130 based on positioning requests made to the UEs.

In some embodiments, the positioning requests are transmitted to all UEs whose subscriber IDs are returned when the location area identifier is changed at S306. For example, a serving base station may transmit a request for location information to each UE whose ID was received at S308. When a UE is outfitted with a GPS receiver, the UE may respond to the location request by transmitting GPS coordinate data. In other embodiments, location data may be collected in other ways, such as by analyzing time of flight information associated with signaling to or from the UE, etc.

All UEs within a geofence are identified at S314. Although S314 may use the same geofenced are from S302, in other embodiments, the geofence of S314 is different from the geofence of S302. In an embodiment, the geofence at S304 may be used to identify base stations or cellular service areas, the geofence at S314 may be used to identify specific UEs within a predetermined area. Accordingly, a second geofenced area may be determined at S312.

The second geofenced area may be a subset of the first geofenced area. In particular, the first geofence may be established around an area that is deliberately larger than the area of interest for which the identities of UEs are desired to ensure that base stations providing service to the area of interest fall within the first geofenced area. For example, a process such as process 400 may be used to establish a geofence that corresponds to the service area of a target cell, or the target cell and one or more of its neighbors. The geofence established at S314 may be in an area that is within the one or more coverage area.

In an embodiment, identifying UEs within a geofenced area at S314 comprises comparing location information for the UEs with coordinates of a geofenced area. For example, when IDs of all UEs that are served by a plurality of cells are received at S308 and the area of interest is smaller than the coverage area of the plurality of cells, a location of each UE may be compared to a geofence that encloses the area of interest, and when the UE is within the area of interest, it is determined to be within the geofenced area at S314.

The locations of the UEs may be provided to external systems at S316. For example, the subscriber IDs and/or location information for the UEs may be provided to emergency responders or law enforcement agencies, which may use the UE data to determine the users that are present at the geofenced location.

Several specific use cases within the scope of this disclosure will now be explained. These use cases are provided to illustrate how various embodiments of this disclosure can be applied in different situations. The use cases are provided for the purpose of example to enhance the understanding of the scope of this disclosure, and are not to be construed as limiting.

In a first use case, a user calls 911 to report a robbery and hostage situation at a bank. The emergency dispatch center 122 that receives the 911 call identifies a region that is a predetermined radius of two kilometers around a location corresponding to the bank's address, and transmits that information to an emergency system 130. The emergency system establishes a geofenced region in the two kilometer radius around the bank and identifies every cell with a coverage area that overlaps with the geofenced region in every cellular network operating in the area, and transmits a request to network devices of each network to change TACs and LACs for the cells operating in the region.

All UEs in each network register to each network by providing IMSIs regardless of whether the UEs are in idle mode or connected mode, and the IMSIs are transmitted to the emergency system 130. The emergency system receives IMSIs for the UEs, and requests location data for each IMSI from the respective networks. After receiving the location data, the emergency system then correlates the location data with the geofenced area, and determines which UEs are present in the geofenced area. The identities of the UEs are then transmitted to a law enforcement agency, which uses the identities and the location data to determine the identities and locations of all persons involved in the hostage situation (victims and perpetrators) that have powered-on cellular devices, providing a level of situational awareness that would not otherwise be possible. The emergency system continues to track the locations of the users in the geofenced region, even after the users leave the geofenced region to keep track of possible accomplices.

In a second use case, a user calls 911 to report a train crash that started a fire in an urban area. In this case, the train crash may be treated differently from the ensuing fire.

For example, the 911 call center may determine a location of the train crash and transmit that information to an emergency service provider. The emergency service provider, in turn, uses the location of the train crash to establish a geofenced area in each cellular network that provides service to the crash location. Because the space occupied by a crash event is typically limited, the geofenced area for the train crash may be limited to a single macro cell of each operator network that serves the location. The emergency management system transmits a location area identifier to each operator network, and receives lists of user identities. The emergency management system then provides this list to emergency responders, which catalog the user information as a possible list of victims of the crash, and use that information to direct rescue efforts.

The fire can spread and potentially affect a larger region in the future. Therefore, the emergency call center may indicate a larger geofenced area to the emergency management system for the fire, or may indicate a location and a number of neighbor tiers around the location. The emergency management system transmits a request to operators of the larger geofenced region to change location area identifiers of associated cells. Such a request may be transmitted at the same time as the request for the train crash geofenced area. The system then identifies UEs that are present in the geofenced area that subscribe to an emergency alert service, and transmits messages that include information about the fire to each of the subscribed UEs.

In a third use case, a user's car breaks down. In this situation, a process for identifying UEs in a geofenced area may be conducted without communicating with a government agency or emergency dispatch center. Instead, the user transmits a message to an emergency mediation server by providing an input into a UE indicating the emergency situation. The emergency mediation server stores several alert groups for the particular user, one of which is designated for low risk emergencies such as the broken down car.

The emergency mediation server receives the input from the UE and establishes a geofenced region that is four neighbor tiers from the target cell providing service to the UE. The emergency mediation server then queries a database to determine which operator networks provide service to members of the user's alert group, and transmits a request to change location identifiers to each of the networks. The emergency mediation server receives a list of UEs in the geofenced area and determines that no UEs of the alert groups are present.

The emergency mediation server then repeats the process for an expanded geofenced area of ten neighbor tiers, and determines that two UEs on the alert list are present in the expanded area. The emergency mediation server provides this information to the UE associated with the user whose car broke down, who may then contact either or both of the two UEs of the alert group that are within the geofenced region for assistance.

In a fourth use case, a mass emergency such as an earthquake or tsunami occurs. An emergency mediation server sends an alert to all users in the vicinity of the mass emergency. In such scenarios, communications infrastructure, and in particular voice circuits to emergency call centers, are often overloaded with those trying to report their status and those checking on them. An embodiment of this disclosure may alleviate the strain on call centers by forwarding an assured delivery message to a call center even when voice circuits are not available to facilitate a voice call.

In an embodiment, users can optionally respond to an emergency alert with status (e.g. "ok" or "not ok") and this status is automatically sent to all emergency contacts. Time stamp and any notes from the user are provided to the emergency contacts. Emergency respondents have access to the status so that can utilize this information to better mobilize their resources. In addition, the user, emergency contacts and emergency respondents can participate in a chat room.

Emergency System

In addition to the specific processes described above, an emergency system 130 may perform a number of processes to provide emergency-related services. Some of those processes are disclosed in the following discussion.

In some emergency situations a person in distress cannot interact directly with an emergency services operator. This could occur in scenarios such as abduction or home intrusion. An embodiment enables a covert emergency call to be automatically requested by the person in distress whenever a normal emergency call (e.g. 911 call) is initiated or through a simple sequence of actions on their cell phone. A dispatch center can then initiate services for the emergency call, including geo-location services, and instructs the UE to start video and sound recording if not already initiated. The dispatch center is then able to notify the appropriate emergency services and provide relevant details including the current location. An embodiment also enables the covert call to be continued in cases where the normal emergency call has been terminated and the phone turned "off" by the attacker or victim.

In some emergency situations, a person in distress may call or message a trusted person, such as a friend or family member, instead of an emergency dispatch center. This may occur if the person in distress is incapable of interacting directly with an emergency services operator. An embodiment enables any trusted person in a defined group (e.g., an Emergency Proxy Group) to contact the dispatch center on behalf of the person in distress and for the dispatch center to initiate a call from the cellular network to the device of the person in distress by a dispatch initiated emergency request. The trusted person determines if the call should be covert or a normal connection. Through the established data connection the dispatch center then initiates a request for geolocation and other information for the device and commences video and sound recording. The dispatch center then notifies the emergency services and provides all relevant information collected including the current location.

In some emergency situations, a person may wish to message and/or locate all members of a group such as trusted friends or familial group as configured by the user. This can be in conjunction with a missing person or an incident that affects another member of that group. An embodiment enables the dispatch center, on behalf of the person in distress, to message and/or establish contact with all Emergency Notification Group members and determine their location.

In some emergency situations, it is possible that a person in distress is outside of a cellular network coverage area. This could be in a remote location during a hiking or sailing trip or in other out of coverage areas such as an underground car park or elevator. An embodiment enables an emergency notification to be stored on the mobile phone for relay to the dispatch center as soon as network conditions allow the message to be sent.

In an embodiment, a 911 call is made by a subscriber. A 911 dispatcher sends a user emergency information request to the emergency system. When the dispatcher requests emergency information from the emergency system, the system can a user's cell phone to see if a 911 call is actually taking place. The emergency mediation server retrieves the user's information configured by the caller (e.g., name, address, medical information, photos, etc.). The emergency mediation server 120 then provides this information to the 911 Dispatcher.

In another embodiment, a 911 call is made by a subscriber. The 911 dispatcher transmits a user emergency active request to the emergency mediation server, and a message is transmitted to the 911 caller's UE. The UE is configured to perform a defined set of actions based on user settings. In an embodiment, these actions include enabling GPS in emergency e.g., if disabled otherwise for privacy; enable remote monitoring capabilities (e.g. prevent phone from turn off or entering airplane mode); and enable UE to alert user of emergency even if device is in silent mode (e.g., in silent mode for meeting when an emergency occurs with one of the user's emergency contacts or an emergency dispatcher contacting UE with an emergency condition).

In another embodiment, a 911 call is made by a subscriber. A 911 dispatcher sends a message to ab eSMLC server to locate the 911 caller. The 911 dispatcher transmits an Emergency Notification request to the emergency mediation server, which looks up the 911 caller's emergency contacts (family, friends, co-workers, doctors, etc.) as configured in a relevant Emergency Notification Group. The emergency mediation server sends a special alert to the device of each emergency contact indicating an emergency situation and location of 911 caller. The emergency mediation server sends contacts periodic messages with updates on 911 caller's location, as well as messages informing them when the 911 call ends. The 911 caller and contacts can share broadcast updates, and the 911 caller can transmit an "All Clear" message to the group.

In another embodiment, a 911 call is made by a third party regarding a subscriber, and the 3rd party is configured in the subscriber's Emergency Proxy Group. The 911 dispatcher sends message to an eSMLC server to locate a subscriber. The emergency mediation server 120 looks up the subscriber's details. The emergency mediation server determines the mobile network for the subscriber, and transmits commands to the eSMLC server to track the location of the subscriber. The server then reports back to the dispatcher the location of the subscriber, and continues to track and provide periodic updates to the dispatcher.

In another embodiment, a 911 call is made by a subscriber. The 911 dispatcher transmits a message to the eSMLC server to locate subscriber, and transmits a Multiparty Locate request to the emergency mediation server, which looks up the multiparty locate contacts (e.g., children) as configured in an Emergency Notification Group. The emergency system 130 determines the mobile network for each multiparty contact, and sends commands to the eSMLC server to track the location of each multiparty contact. The system reports the location of each multiparty contact to the dispatcher, and continues to track and provide location information.

In another embodiment, a 911 call is made by a subscriber. A dispatcher determines 911 caller is in a situation of heightened danger. The dispatcher sends a remote monitor request to the emergency mediation server, which transmits a message to the UE to silently turn on device audio and video for the subscriber. The UE continuously transmits audio and video without any notification on the UE that this is occurring, even if turned off or in airplane mode (e.g., the UE will continue to appear off or in airplane mode). The UE remains in this state until the emergency system transmits a message to the UE to stop remote monitoring.

In an embodiment in which a subscriber attempts to dial 911 without RF coverage, the call does not go through (e.g., hiking in a remote area). In such an embodiment, 911 emergency messages are queued up by the UE, and once RF coverage returns, the UE automatically sends text messages to emergency contacts.

In an embodiment, a cellular device is attached to a medical application or linked to device with the capability of providing measurements for medical purposes. In such an embodiment, when a medical emergency occurs (e.g., pulse stops, blood sugar drops), emergency messages with the user's location are automatically sent to members of an emergency contact list as configured in a relevant Emergency Notification Group.

In an embodiment, a subscriber can alert emergency contacts of the presence of an emergency without dialing 911 by providing an input into a UE. The user can define emergency buttons (e.g., roadside assistance, having a baby, sick at school, family member rushed to hospital, car accident) and can specify additional info. The emergency mediation server looks up the subscriber's emergency contacts (family, friends, co-workers, doctors, etc.). The emergency mediation server sends a special alert to devices of contacts indicating an emergency and a location of the subscriber, and sends periodic messages to contacts with updates on the emergency subscriber's location (if applicable to the emergency). The user affected by the emergency can send broadcast updates to group members (e.g., tow truck arrived), including a message indicating that the emergency situation is resolved.

In an embodiment, a police officer intends to pull over automobile and calls in its license plate number to a dispatcher. In an embodiment, the dispatcher transmits a pull over request to the emergency mediation server. The server looks up contacts associated with the license plate number and sends special alerts to devices of each of these contacts indicating that the police are pulling over this vehicle. The driver will know this is an authorized police officer and they can pull over safely. Updates are sent to contacts notifying of the police approach, the outcome of the stop, and when the stop is completed.

Embodiments of the present disclosure provide several improvements to emergency services. For example, embodiments of the present disclosure may provide a set of UE identities for UEs that are affected by an emergency situation in an efficient manner. While other techniques are limited to connected devices in a single network, identities provided by an embodiment of this disclosure include identities of UEs in idle mode and across a plurality of operator networks.

What is claimed is:

1. A method for identifying user equipment (UE), the method comprising:
   receiving an indication of an emergency situation;
   establishing a first geofenced area associated with the emergency situation;
   identifying one or more cells in the first geofenced area;
   transmitting a request to change a location area identifier value to one or more network providing service to the one or more cells; and
   receiving identities of UEs in the first geofenced area,
   wherein the identities of UEs in the first geofenced area are provided when the location area identifier value is changed.

2. The method of claim 1, wherein the identities of UEs include identities of UEs in idle mode and identities of UEs in connected mode.

3. The method of claim 1, further comprising:
   establishing a second geofenced area; and
   identifying all UEs within the second geofenced area.

4. The method of claim 1, wherein second geofenced area is a circle that is defined by radius around a point.

5. The method of claim 1, wherein the point is a location of a first UE.

6. The method of claim 5, wherein the indication of the emergency situation is received from the first UE.

7. The method of claim 1, wherein requests to change the location area identifier value are transmitted to a plurality of cellular networks each operated by different operators.

8. The method of claim1, wherein, in response to the request to change the location area identifier value, a network providing service to the one or more cells replaces a first location area identifier value with a second location area identifier value.

9. The method of claim 8, wherein, after replacing the first location area identifier value with the second location area identifier value, the one or more network restores the original location area identifier value by replacing the second location area identifier value with the first location area identifier value.

10. The method of claim 8, wherein the first and second location area values are a Location Area Code (LAC) or a Tracking Area Code (TAC).

11. An emergency management system coupled to a cellular telecommunications network, the system comprising:
    a memory;
    a processor; and
    at least one non-transitory computer readable medium with executable instructions stored thereon which, when executed by the processor, perform the following operations:
    receiving an indication of an emergency situation;
    establishing a first geofenced area associated with the emergency situation;
    identifying one or more cells in the first geofenced area;
    transmitting a request to change a location area identifier value to one or more network providing service to the one or more cells; and
    receiving identities of UEs in the first geofenced area,
    wherein the identities of UEs in the first geofenced area are provided when the location area identifier value is changed.

12. The system of claim 11, wherein the identities of UEs include identities of UEs in idle mode and identities of UEs in connected mode.

13. The system of claim 11, further comprising:
    establishing a second geofenced area; and
    identifying all UEs within the second geofenced area.

14. The method of claim 1, wherein second geofenced area is a circle that is defined by radius around a point.

15. The method of claim 1, wherein the point is a location of a first UE.

16. The method of claim 15, wherein the indication of the emergency situation is received from the first UE.

17. The system of claim 11, wherein requests to change the location area identifier value are transmitted to a plurality of cellular networks each operated by different operators.

18. The system of claim11, wherein, in response to the request to change the location area identifier value, a network providing service to the one or more cells replaces a first location area identifier value with a second location area identifier value.

19. The system of claim 18, wherein, after replacing the first location area identifier value with the second location area identifier value, the one or more network restores the original location area identifier value by replacing the second location area identifier value with the first location area identifier value.

20. The system of claim 18, wherein the first and second location area values are a Location Area Code (LAC) or a Tracking Area Code (TAC).

* * * * *